(12) United States Patent
Manfredi

(10) Patent No.: US 11,015,839 B2
(45) Date of Patent: May 25, 2021

(54) SOLAR CONCENTRATOR

(71) Applicant: SUN GEN SRL, Castelnovo Ne' Monti (IT)

(72) Inventor: Ugo Manfredi, Castelnovo Ne' Monti (IT)

(73) Assignee: SUN GEN SRL, Castelnovo Ne' Monti (IT)

( * ) Notice: Subject to any disclaimer, the term of this patent is extended or adjusted under 35 U.S.C. 154(b) by 155 days.

(21) Appl. No.: 16/471,982

(22) PCT Filed: Dec. 15, 2017

(86) PCT No.: PCT/IB2017/058006
§ 371 (c)(1),
(2) Date: Jun. 20, 2019

(87) PCT Pub. No.: WO2018/116103
PCT Pub. Date: Jun. 28, 2018

(65) Prior Publication Data
US 2020/0096234 A1    Mar. 26, 2020

(30) Foreign Application Priority Data

Dec. 21, 2016 (IT) .................. 102016000129373

(51) Int. Cl.
*F24S 23/71* (2018.01)
*F24S 23/74* (2018.01)
*F24S 23/70* (2018.01)

(52) U.S. Cl.
CPC ............... *F24S 23/71* (2018.05); *F24S 23/74* (2018.05); *F24S 2023/874* (2018.05); *F24S 2023/876* (2018.05)

(58) Field of Classification Search
CPC ...... F24S 23/71; F24S 23/74; F24S 2023/874; F24S 2023/876; F24S 2023/834
See application file for complete search history.

(56) References Cited

U.S. PATENT DOCUMENTS

| 811,274 | A | * | 1/1906 | Carter | ................... | F24S 30/452 |
| | | | | | | 126/684 |
| 3,868,823 | A | * | 3/1975 | Russell, Jr. | ............. | F24S 23/79 |
| | | | | | | 60/641.15 |

(Continued)

FOREIGN PATENT DOCUMENTS

| WO | 2010052282 A1 | 5/2010 |
| WO | 2011033546 A2 | 3/2011 |

*Primary Examiner* — David J Laux
(74) *Attorney, Agent, or Firm* — Browdy and Neimark, PLLC

(57) ABSTRACT

A concentrator (10) of sun rays comprising: a reflective body (15) adapted to reflect incident sun rays towards a focal segment (SF) at which the reflected sun rays intersect, wherein the reflective body (15) comprises a plurality of reflective first sheets (40) alongside each other along a flanking direction parallel to the focal segment (SF) and each of which is inclined with respect to a plane perpendicular to a plane passing through the middle point (PM) of the focal segment (SF) and orthogonal to the focal segment itself, wherein each first sheet (40) comprises a reflective surface defined by a plurality of parabolas (401), which are alongside each other with respect to the flanking direction of the first sheets (40) and each have a vertex (Vn1) placed on a vertex segment (SV1), which joins all the vertices (Vn1) of the parabolas (401) of each first sheet (40) have a focal distance varying along the flanking direction and are configured such that each parabola has a focal point (F1, Fn1, F2) placed on the focal segment (SF).

12 Claims, 9 Drawing Sheets

(56) References Cited

U.S. PATENT DOCUMENTS

| | | | | |
|---|---|---|---|---|
| 4,359,041 A * | 11/1982 | Snodgrass | ................ | F24S 23/74 |
| | | | | 126/608 |
| 8,536,441 B2 * | 9/2013 | Giacalone | ............. | F24S 30/452 |
| | | | | 136/248 |
| 8,669,462 B2 * | 3/2014 | Almogy | .................. | F24S 23/74 |
| | | | | 136/246 |
| 8,686,279 B2 * | 4/2014 | Almogy | ............. | H01L 31/0547 |
| | | | | 136/246 |
| 9,270,225 B2 * | 2/2016 | Clavelle | .................. | F24S 20/20 |
| 2011/0168160 A1 * | 7/2011 | Martinez Moll | ....... | F24S 23/74 |
| | | | | 126/573 |
| 2012/0037206 A1 * | 2/2012 | Norman | ................ | H02S 40/425 |
| | | | | 136/246 |
| 2012/0160235 A1 * | 6/2012 | Terry | ...................... | F24S 25/65 |
| | | | | 126/696 |
| 2014/0182660 A1 * | 7/2014 | Almogy | ................ | F24S 30/425 |
| | | | | 136/246 |
| 2015/0377516 A1 * | 12/2015 | Nielsen | .................. | F24S 23/74 |
| | | | | 126/693 |

\* cited by examiner

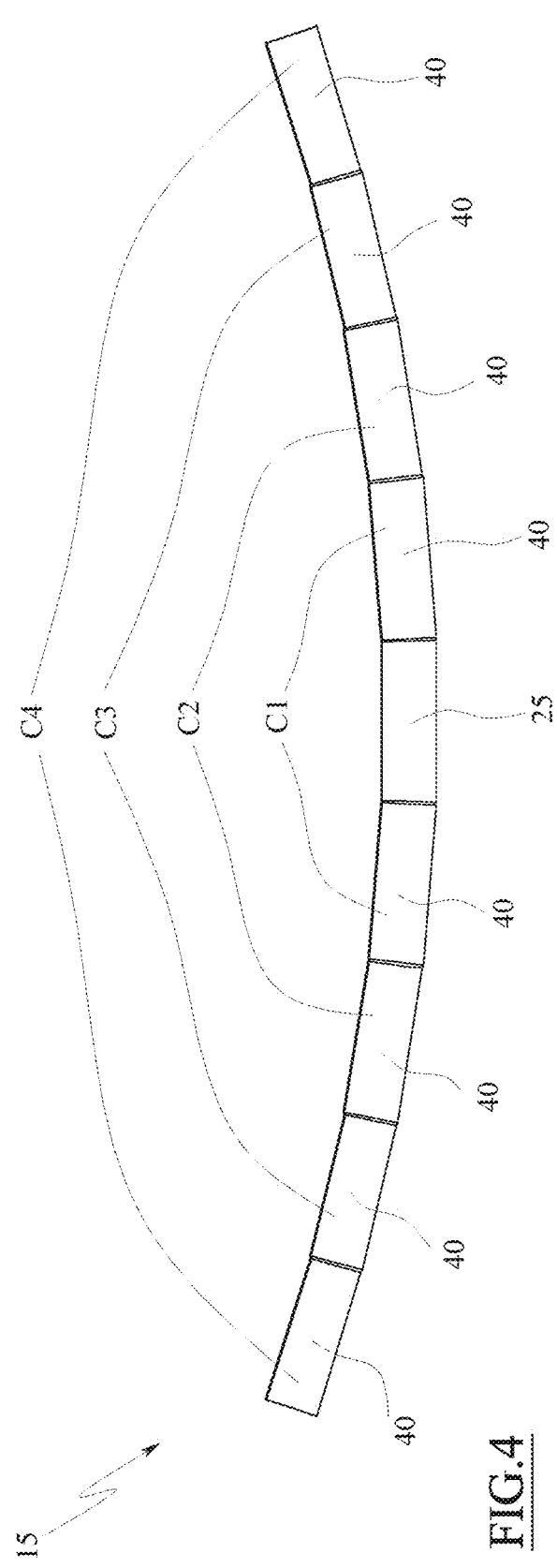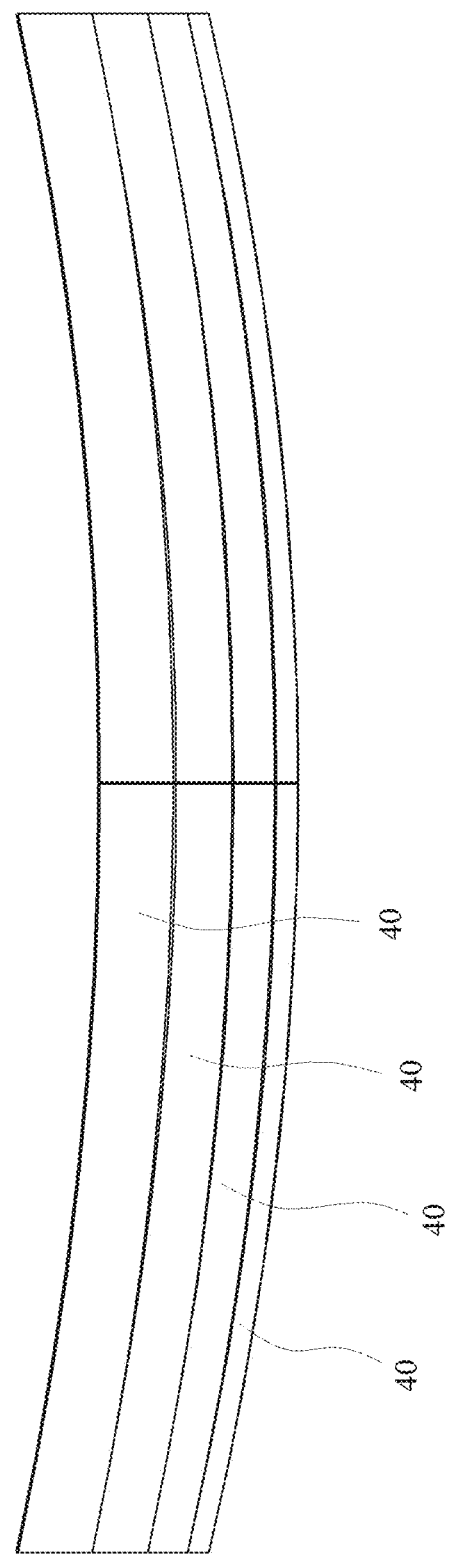

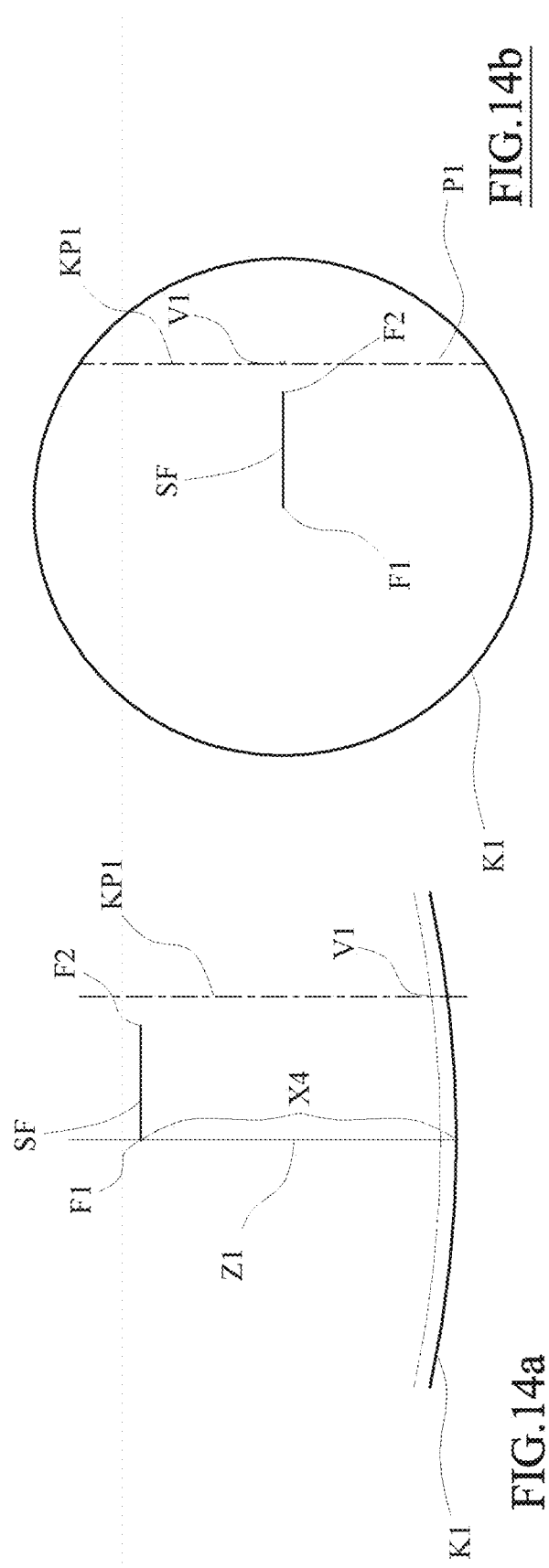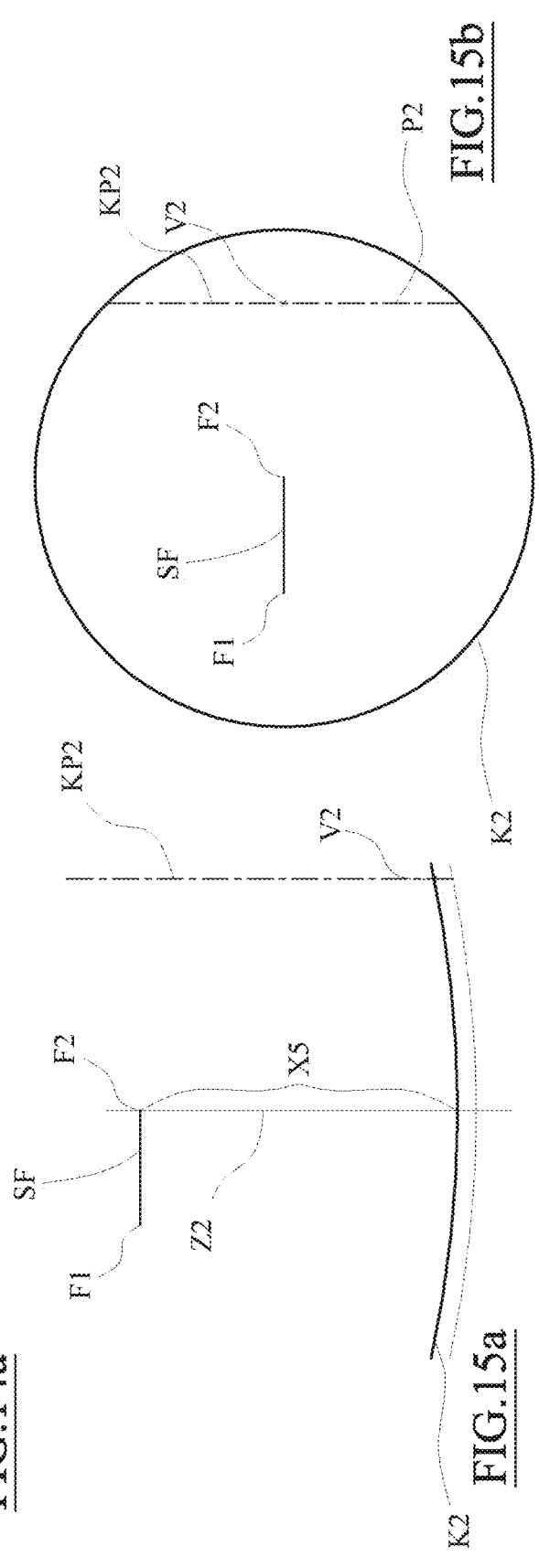

SOLAR CONCENTRATOR

TECHNICAL FIELD

A concentrator of sun rays, in particular a concentrator of sun rays of the hybrid parabolic "dish-trough" type for conversion systems of solar energy into electric and/or thermal energy, for example a solar concentrator called "parabolic cline", or of parabolic type made by finite elements defining a continuum with an infinite number of graduations from one end to the other.

PRIOR ART

As is known, the sun ray conveyor devices generally consist of a sheet capable of reflecting the incident sun rays, for example, a sheet of metal material, which is oriented so as to convey the ray reflected in a predefined zone, where a target is positioned, i.e. photovoltaic cells and/or heat exchangers and/or thermoelectric converters and/or photo-catalytic reactors.

A first type of known solar concentrator, under the name 3D parabolic concentrator or "parabolic dish", consists of a three-dimensional (3D) reflective surface called rotating paraboloid, since obtained rotating around an axis of a two-dimensional parabolic profile.

The 3D rotating paraboloid is a lens of the "imaging" type which has a high yield, typically comprised between 70% and 80%, and a maximum concentration of sun rays, even greater than 5000 times in well-designed lens. However, the high concentration is problematic for many applications (the materials placed in focus melt or are damaged) and the "imaging" lens repeats the solar radiation Gaussian energy distribution in focus, with high intensity at the centre and degrading moving away there from. The high central energy peaks can easily damage both heat and photovoltaic absorbers, while the strongly irregular flow distribution makes a connection in series of photovoltaic cells placed in focus difficult, the outlet current whereof would be limited by the less illuminated cell. For such reasons, the 3D paraboloid concentrators are used in combination with FV cells only interposing the "flow homogenizers" which attenuate the central energy peak and increase the energy available at the edges of the focal zone. Even heat receivers not correctly designed, may be damaged by the concentrated radiation after a period of brief use.

The "dish" or 3D paraboloid concentrators are of relatively complex construction and necessarily require a solar tracking on two axes, which may be made with motor-driven mounts of alt-azimuth or polar type. For photovoltaic applications, the need for a high performance flow homogenizer further increases the constructive complexity and the potential loss of energy. The maximum concentration of a 3D paraboloid is very high, and exceeds 45,000 times, as calculated by the thermo-dynamic equation $C_{max}=1/(sen (\theta_s))^2$ where $\theta_s$ is the solar half-angle. The practical concentration limit of the 3D paraboloid is however comprised between 1500 and 5000 times since higher values would require a very high optical precision and tracking not compatible with mass production.

A second type of known conveyor devices, which is generally called parabolic cylinder or PTC (Parabolic Trough Collector) concentrator, consists of a reflective sheet of a substantially rectangular shape and having a single curvature axis, parallel to the longitudinal axis of the sheet, identifying cross sections of parabolic shape. Dissecting the PTC in different positions along the axis, identical parabolic profiles of the same focal length are obtained.

The parabolic cylinder concentrator is inexpensive enough and of simple construction, requires the solar tracking on a single axis, is widely used for thermal applications and for the production of electric energy with thermo-dynamic turbines (CSP, Concentrated Solar Power). The main limit thereof is the low obtainable concentration, about 70 times, which makes it unusable for applications of photovoltaic type with multi-junction cells made with semi-conductors of the groups III-V of the periodic table: the low concentration would make a large surface of FV cells necessary, with consequent high costs thereof. The low concentration also makes other applications impractical, such as the thermoelectric converters (TEG) and the placement of chemical and photovoltaic reactors in the focus of the concentrator. The typical PTC yield is lower than the "dish" and is placed typically between 50% and 60%: the low yield depends on the mono axial tracking which introduces geometric losses (cosine losses) significant and increasing as the latitude increases, and from further losses at the edges of the concentrator.

The PTC concentrator reflects the sun rays concentrating them on a focal line parallel to the curvature axis identifying a focal segment, i.e. a rectilinear segment on which the focal points of all the cross sections of the parabolic cylinder rest, having a length equal to that of the reflective sheet of which it consists. The finite dimension of the solar disc (about 0.5°) sets a theoretical limit on the PTC concentration equal to $C_{max}=1/sen (\theta_s)=214.6$, where $\theta_s$ is the solar half-angle. The practical limit of PTC concentration is equal to about ⅓ of the theoretical value, factor which makes it unsuitable for photovoltaic application with multi-junction cells, which optimally work with concentrations comprised between 300 and 1000 times, and is unsuitable for many new applications which require a higher concentration.

A third type of quite widespread solar concentrators is the linear Fresnel concentrator: a series of reflective foils of generally flat shape, reflects the sun light on a focal line in a fixed position above the reflective foils. The foils are hinged along the axis thereof and may rotate varying the inclination thereof independently from each other, always maintaining the sun rays focused on the focal line, wherein the contributions of the different foils overlap increasing the concentration. A secondary concentrator placed in the proximity of the focal line, often of CPC (Compound Parabolic Concentrator) type, may further increase the total concentration of the system. The linear Fresnel concentrators have a slightly lower cost with respect to the PTCs, they may achieve concentrations higher than 100 times, but have a lower yield with respect to the PTCs due to the many loss mechanisms which characterises them, in a large part attributable to the fixed position of the reflectors and focus, which do not allow optimal performances during the day and during the year.

Both the PTCs and the linear Fresnel concentrators are only adapted to very large plants, otherwise the losses at the edges weigh down the yield of the system too much.

For concentration photovoltaic applications (HCPV, HCPVT) of the "dense array" type, between the "classic" concentrators previously seen, only the "dish" concentrator is practically usable, while both PTC and Fresnel do not achieve the minimum level of required concentration of at least 300 sun. However, the "dish" concentrator has a concentration too high and above all an uneven light flow in the focal zone which forces the use of flow homogenizers of complex construction.

The parabolic cylinder or PTC concentrator is not adapted for a use besides axes, since when a PTC concentrates the rays on an inclined target, only a minimal portion of the rays reflected by the PTC will perfectly focus, while a good part of the rays will focus before or after the target. As a consequence of this the overall energy distribution on the flat face of the target assumes a bone-shaped profile.

An object of the present invention is that of reducing to a minimum the irregularity problem of the rays reflected on the target surface, i.e. the photovoltaic panel and/or heat exchanger and/or other type of use, a solution which guarantees a high level of solar concentration and which is simple, rational and inexpensive.

Such objects are achieved by the features of the invention described in the independent claim.

The dependent claims outline preferred and/or particularly advantageous aspects of the invention.

DESCRIPTION OF THE INVENTION

The invention provides a concentrator of sun rays comprising a reflective body adapted to reflect incident sun rays towards a focal segment wherein the reflected sun rays intersect, wherein the reflective body comprises a plurality of reflective first sheets alongside each other along a flanking direction parallel to the focal segment and each of which is inclined with respect to a plane perpendicular to a plane passing through the middle point of the focal segment and orthogonal to the focal segment itself, wherein each first sheet comprises a reflective surface defined by a plurality of parabolas, which are alongside each other with respect to the flanking direction of the first sheets and each have a vertex placed on a vertex segment, which joins all the vertices of the parabolas rests on a same plane of the focal segment; wherein the parabolas of each first sheet have a focal distance varying along the flanking direction and are configured such that each parabola has a focal point placed on the focal segment.

Due to such a solution, the energy contributions of the first sheets are homogeneously added up with each other, and it is possible to achieve solar concentration levels indicatively comprised between 300 and 1500 times.

In the practice, a solar concentrator of the "parabolic cline" type is made available which is a generalization of the known "parabolic trough" concentrator which expands the use thereof towards high concentrations, also obtaining even light flows at the focal segment which maintains a substantially rectangular shape. To achieve the desired level of concentration, such a concentrator uses a plurality of first sheets which for the conformation thereof overlap the energy contribution thereof in the focal zone: even if the single concentrator does not exceed a concentration of about 70 times, concentrations, evenly distributed on the target surface, of 300-1500 times may be obtained with relative ease by overlapping the contributions.

In the practice, due to such a configuration the solar concentrator concentrates the sun light on an area which has a narrow and long rectangular shape and allows to obtain, in such an area, an even reflected sun ray flow, suitable for HCPVT/TEG/thermal/photochemical/photocatalytic applications, furthermore with efficiency clearly greater than the known concentrators of PTC type and of Fresnel type and equal to concentrators of the 3D parabolic type.

Advantageously, the plurality of first sheets may be symmetrically arranged with respect to a plane passing through the middle point of the focal segment and orthogonal to the focal segment itself.

According to another aspect of the invention, the solar concentrator may comprise a second sheet shaped as a parabolic cylinder alongside, with respect to the flanking direction, at least one of the first sheets, wherein the parabolic cylinder comprises a reflective surface defined by a plurality of parabolas alongside each other with respect to the flanking direction and each having a vertex placed on a vertex segment, which joins all the vertices of the parabolas and is parallel to the focal segment, wherein the parabolas of each second sheet have a constant focal distance along the flanking direction and are configured such that each parabola has a focal point placed on the focal segment.

Generally, such a second sheet is used when the solar concentrator is provided with an uneven number of reflective sheets.

Preferably, the middle plane of the second sheet orthogonal to the vertex segment thereof may coincide with a plane passing through the middle point of the focal segment and orthogonal to the focal segment itself.

According to another aspect of the invention, the plurality of first sheets may be symmetrically arranged on opposite sides with respect to the second sheet, for example the vertex segments of the first sheets extending (ideally along an alignment axis) on opposite sides of the vertex segment of the second sheet.

In this way the quantity of sun rays, therefore energy, is advantageously increased, which the reflective body may direct towards the target: a greater sun light concentration level corresponds to a greater number of sheets.

According to a further aspect of the invention, the solar concentrator may comprise a secondary lens interposed between the reflective body and the focal segment.

The secondary lens may be placed between the concentrator and the focal segment or besides the focal segment, practically distancing the focal target besides the focal segment, allows the rays focused by the main concentrator, to slightly diverge, thus allowing the secondary lens to produce a more even lighting of such a focal target placed besides the focal segment. Through the secondary lens it is further possible to make a further concentration and evenness of sun rays reflected by the reflective body.

According to another aspect of the invention, the reflective body is monolithic. Due to such a solution, a solid and easy to install solar concentrator is made available. Furthermore, such a solution allows to not have to optically align the different component reflective sheets on site.

According to another aspect of the invention the concentrator may comprise a solar tracking bearing structure adapted to support and orient the reflective body.

Due to such a solution, the concentrator may be maintained around the maximum yield for the most part of the day.

According to a further aspect of the invention, the bearing structure may comprise a fixed base and a shell movably connected to the base, wherein the shell is formed by a grid of beams.

In this way, a robust and at the same time light solar concentrator is made available.

According to another aspect of the invention, the reflective body may be fixed to the bearing structure, in particular to the grid of beam which defines the shell, by gluing.

Due to such a solution, the concentrator assembly process is sped up and made simpler, since the gluing step allows to compensate small dimensional differences between the reflective body and the mechanical support structure. Furthermore, the structure thus made is lighter with respect to the case wherein threaded connections are used.

According to another aspect of the invention, the concentrator may comprise a target placed at/near the focal segment.

For example, the target may comprise a heat exchanger.

As an alternative or in addition, the target may comprise one or more concentration photovoltaic modules or other types of concentrated solar energy users, such as thermoelectric generators, chemical, electrochemical, photovoltaic converters which use concentrated sun light energy to produce useful reactions.

According to an aspect of the invention, each first sheet may comprise a first two-dimensional parabola of the plurality of parabolas provided with a first focal point placed at a first end of the focal segment, and a second two-dimensional parabola of the plurality of parabolas provided with a second focal point placed at a second end of the focal segment opposite the first end thereof where the first focal point is found, wherein the first parabola has a focal distance different and greater than the focal distance of the second parabola; the first sheet being defined by a Bezier surface, which approaches a multi-parabolic surface, which joins the first parabola to the second parabola. Advantageously, the first parabola may be obtained by the intersection between a first plane (substantially) orthogonal to the focal segment and which does not contain the first focal point and a circular paraboloid having as a focus the first focal point and as an axis an axis resting on a plane orthogonal to the focal segment and passing through the first focal point; and the second parabola may be obtained by the intersection between a second plane (substantially) orthogonal to the focal segment and which does not contain the second focal point and a circular paraboloid having as a focus the second focal point and as an axis an axis resting on a plane orthogonal to the focal segment and passing through the second focal point.

Due to such a solution, the concentrator has a shape optimized to produce the desired level of solar concentration on a narrow and long rectangle, and this is obtained with relative simplicity and high industrial repeatability.

The first plane and the second plane orthogonal to the focal segment, could as an alternative be replaced respectively by a pair of first half-planes and a pair of second half-planes, wherein each of such half-planes is in any case orthogonal to the focal segment. Each half-plane of first half-planes and each half-plane of second half-planes may be incident (with an angle slightly less than 180° or slightly greater than 180°) to the other respective half-plane on a straight line contained in the plane containing the focal segment and the vertex segment of the first sheet. In the practice, each parabola is, thus, defined by two parabola branches joined to the vertex, for example mutually different.

BRIEF DESCRIPTION OF THE DRAWINGS

Further features and advantages of the invention will appear clear from the reading of the following provided description by way of a non-limiting example, with the aid of the figures shown in the accompanying drawings.

FIG. 4 shows a front view of the reflective body of FIG. 2.

FIG. 5 shows a side view of the reflective body of FIG. 2.

FIG. 14a is a first constructive diagram for constructing the solar concentrator according to the invention.

FIG. 14b shows a plan view of FIG. 14a.

FIG. 15a is a second constructive diagram for constructing the solar concentrator according to the invention.

FIG. 15b shows a plan view of FIG. 15a.

BEST WAY TO CARRY OUT THE INVENTION

Figure 1:
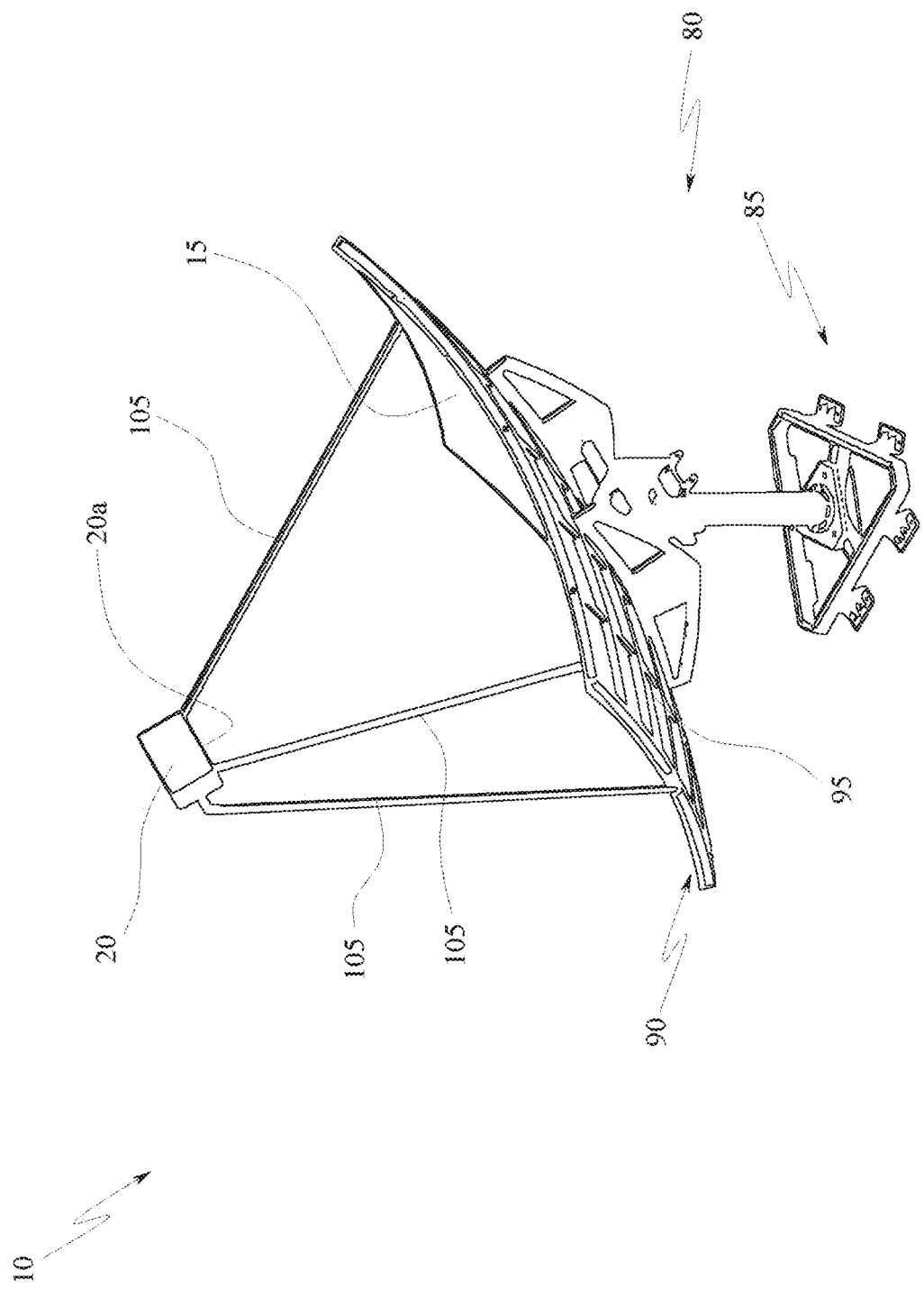
FIG. 1 shows a perspective view of the concentrator according to the invention.
Figure 2:
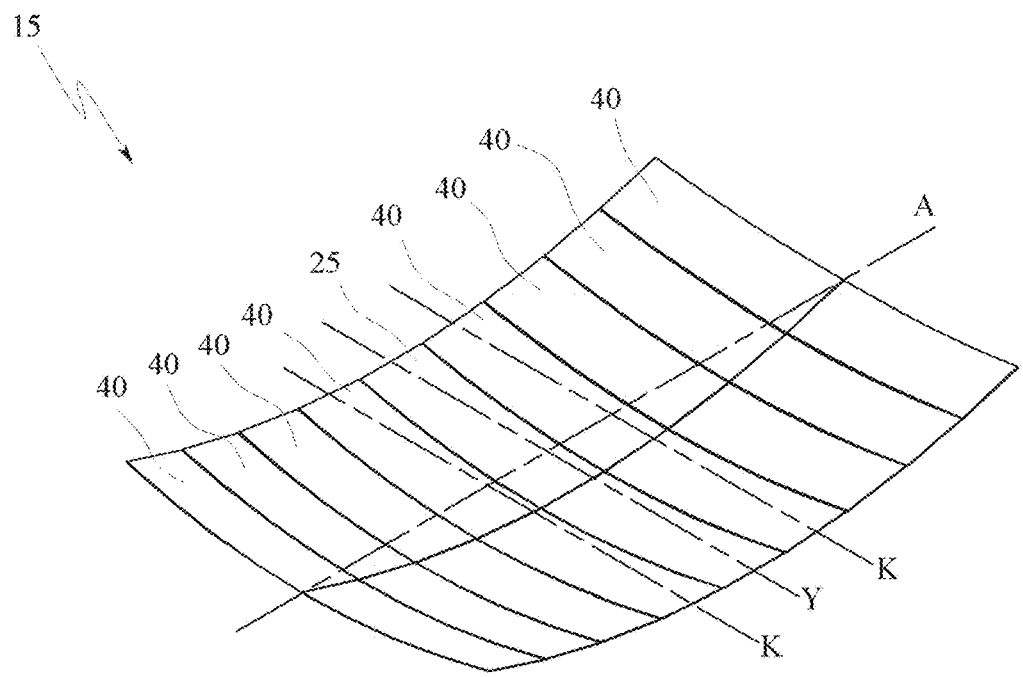
FIG. 2 shows a perspective view of an embodiment of a reflective body of the solar concentrator of FIG. 1.
Figure 3:
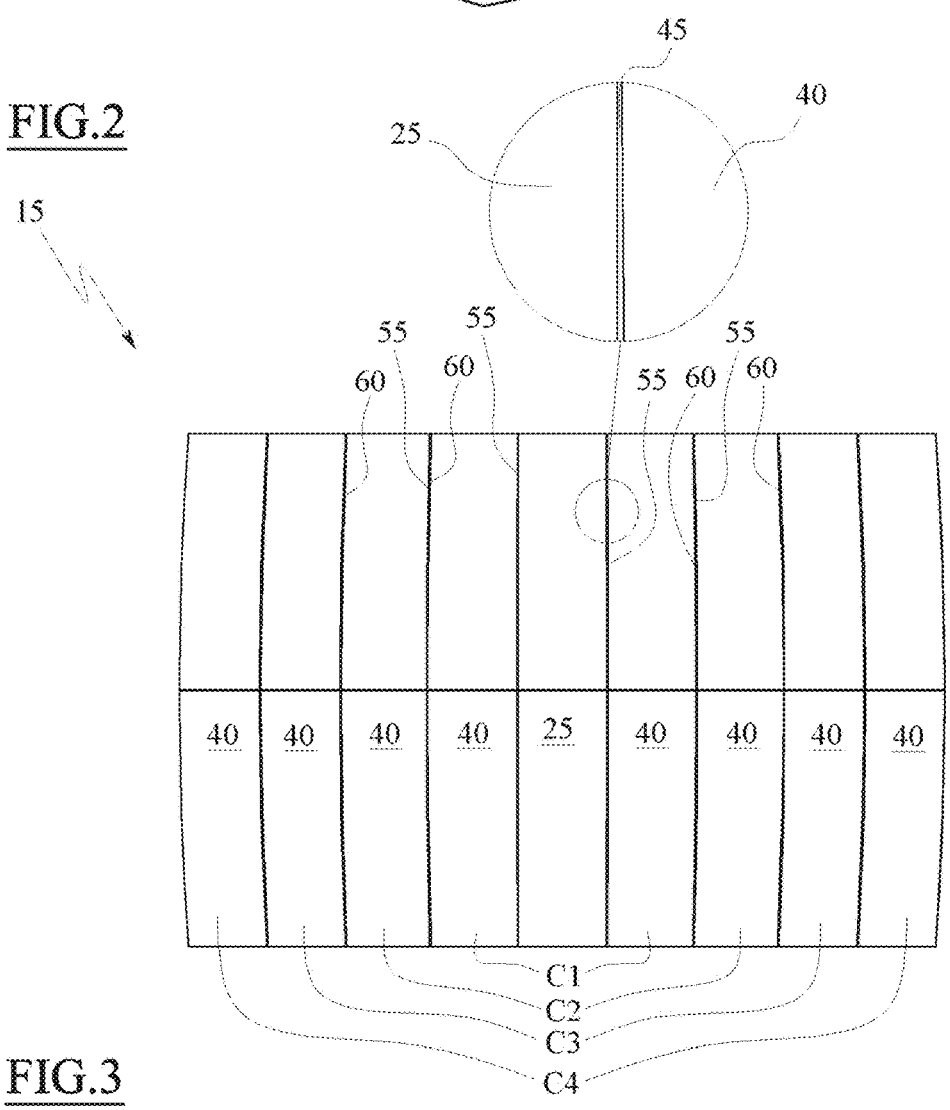
FIG. 3 shows a top view of the reflective body of FIG. 2.
Figure 6:
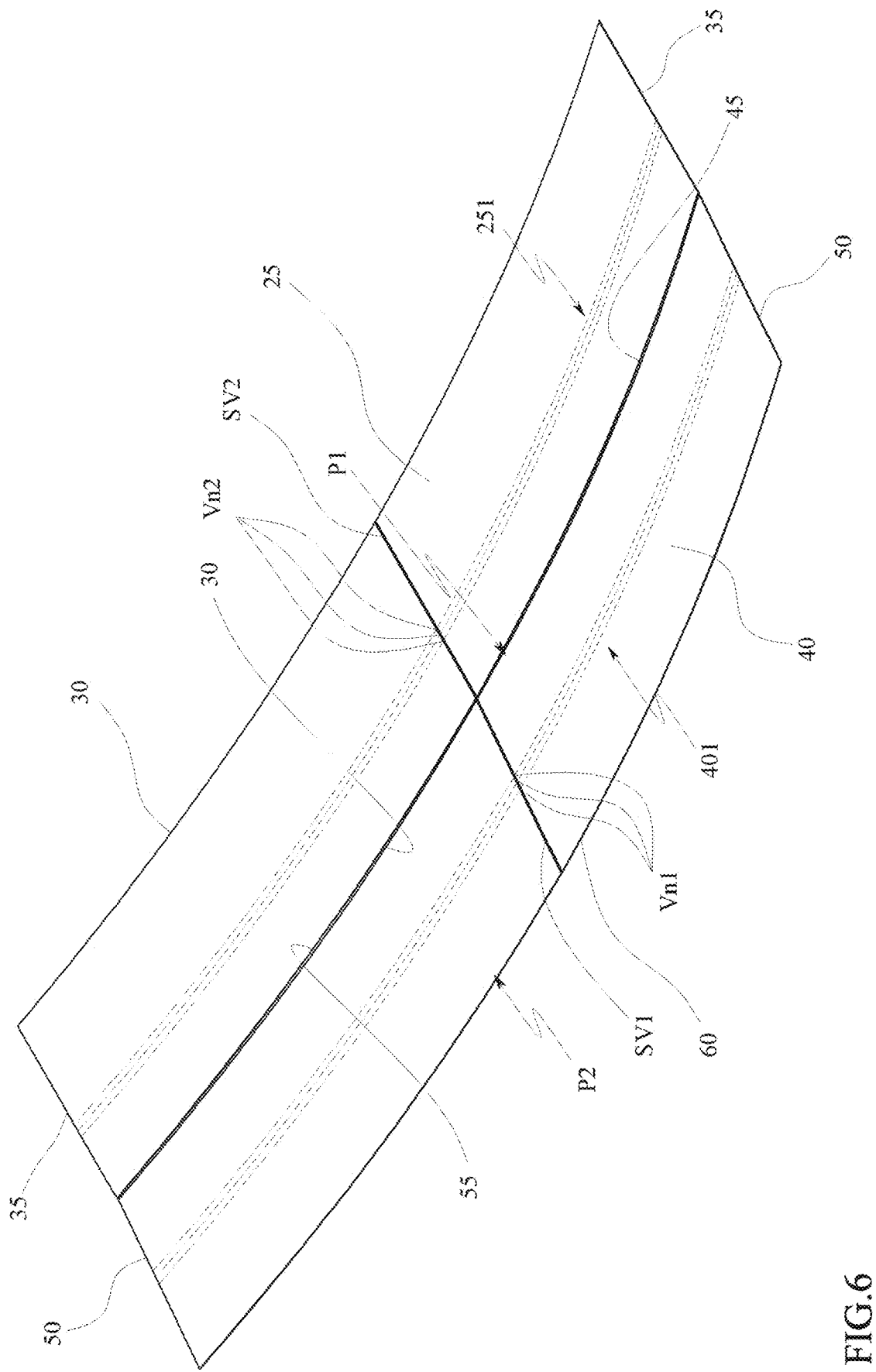
FIG. 6 shows a detail of FIG. 2.

With particular reference to the figures, a concentrator of sun rays is indicated with reference numeral 10.

The concentrator 10 is provided with a reflective body 15 substantially concave, which is adapted to concentrate the sun rays which hit it towards a focal segment SF wherein the reflected sun rays intersect.

The reflective body 15 comprises a plurality of reflective sheets alongside each other and configured in the way that will be described below, such reflective sheets are mutually indissolubly connected (for example glued one to another) so as to form a monolithic reflective sheet 15, i.e. movable, installable and manipulatable as one single body (stable in time).

The concentrator 10, i.e. the reflective body 15, comprises a plurality of reflective first sheets 40 alongside each other along a flanking direction parallel to the focal segment SF, for example (when the concentrator 10 is placed in operation).

In particular, each first sheet 40 has an elongated shape with longitudinal axis K and the first sheets 40 are alongside each other so that the longitudinal axes K are substantially parallel to each other.

The first sheets 40 are for example partially spaced from each other so as to define an interspace 45.

Each first sheet 40 is inclined, as will be better described below, at an angle δ with respect to a plane perpendicular to a plane passing through the middle point PM of the focal segment SF and perpendicular to the focal segment itself (i.e. each first sheet 40 is inclined at the angle δ with respect to a plane perpendicular to the sun rays).

Each first sheet 40 is delimited, in the direction transversal to the longitudinal axis K thereof by a pair of minor edges 50, and in a direction substantially parallel to the longitudinal axis K thereof, by a pair of major edges, of which a first edge 55 proximal to the centre plane which passes through the middle point PM of the focal segment SF and is perpendicular thereto, and a second edge 60 distal from such a central plane.

The first edge 55 and the second edge 60 may for example have a profile formed by a line broken into two portions, or as an alternative a profile broken into more portions or curvilinear or the like.

Each first sheet 40 comprises a reflective surface defined by a plurality of two-dimensional parabolas 401 alongside along the flanking direction of the first sheets 40, i.e. in a direction perpendicular to the longitudinal axis K, so as to create a continuous surface.

Each first sheet 40, i.e. the reflective surface thereof, comprises in particular a first two-dimensional parabola P1, which is for example adjacent or proximal and distinct from the first edge 55 and is provided with a first focal point F1 placed at an end of the focal segment SF, and a second two-dimensional parabola P2, which is for example adjacent or proximal and distinct from a second edge 60 and is provided with a second focal point F2 place at an end of the focal segment SF opposite to the first focal point F1.

In the practice, the parabolas 401 are arranged between the first edge 55 and the second edge 60 of each first sheet 40, i.e. the first parabola P1 and the second parabola P2 represent the end parabolas of the plurality of parabolas 401 in the flanking direction of the first sheets 40.

The first parabola P1 and the second parabola P2 are introductory to the formation and design of each first sheet 40 of the concentrator 10, as will be better described below.

Each parabola 401 rests on a plane parallel to the longitudinal axis K of the corresponding first sheet and has a focal distance varying along the flanking direction so that each parabola 401 have a focal point Fn1 placed on the focal segment SF and distinct from the focal point of the adjacent parabolas 401.

Figure 8:
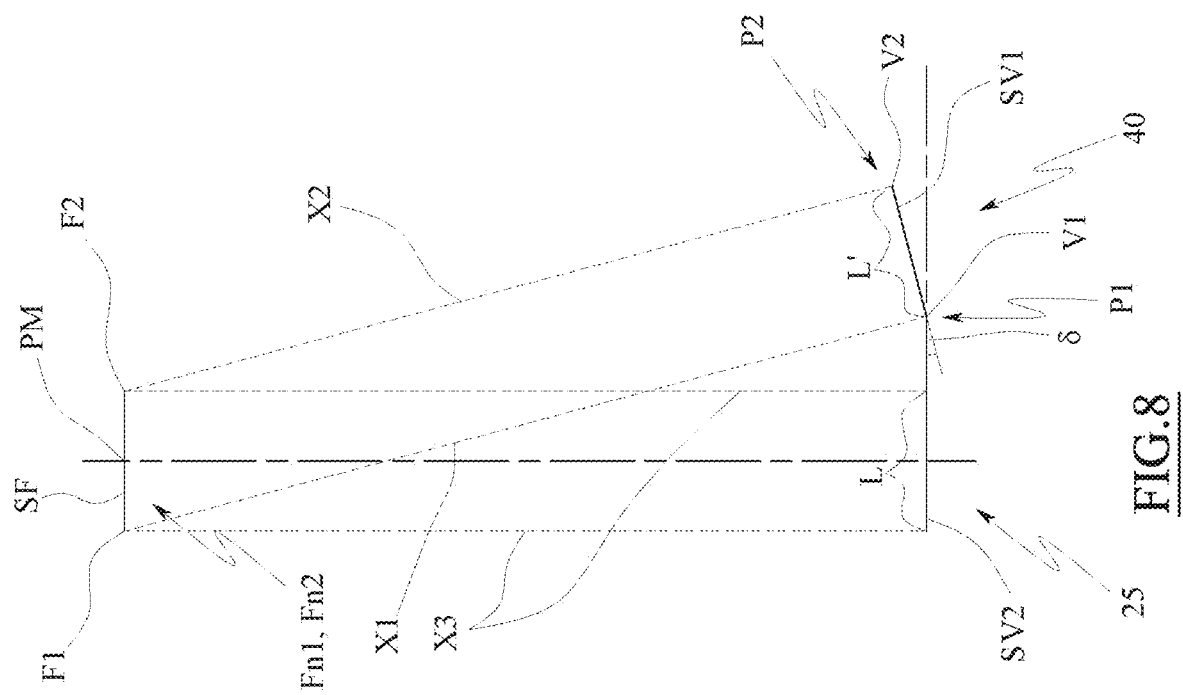
FIG. 8 shows a second diagram of the operation of the solar concentrator.
Figure 7:
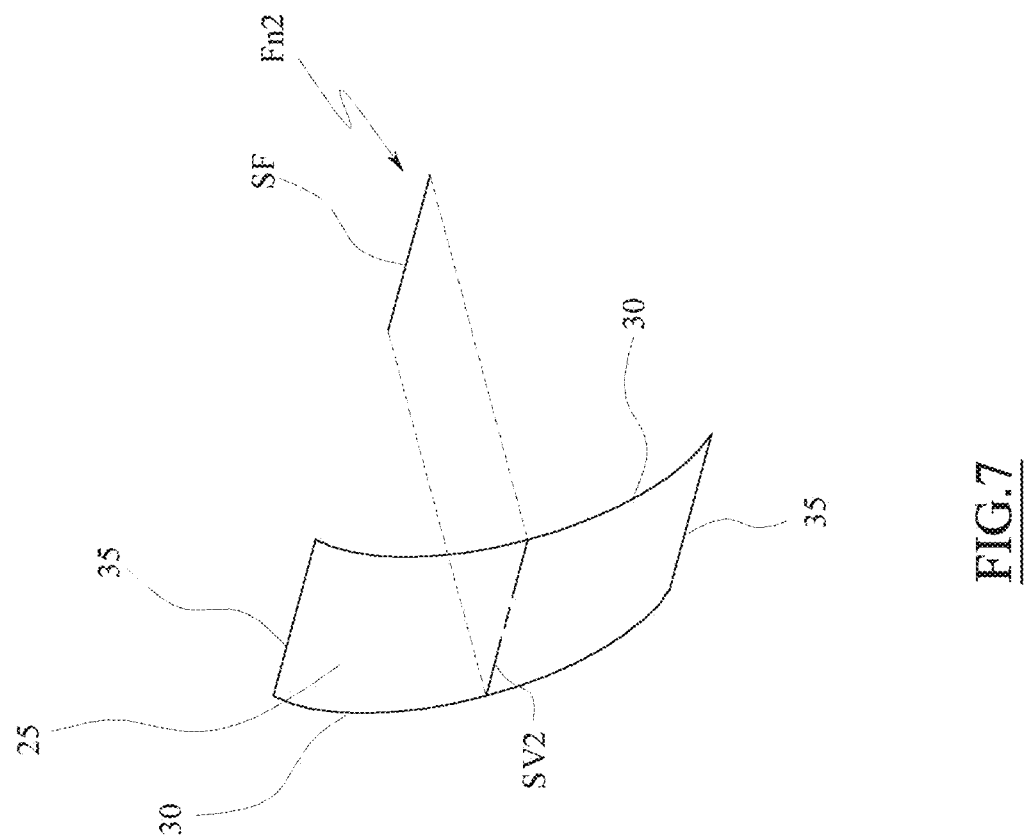
FIG. 7 shows a first diagram of the operation of the solar concentrator.
Figure 10:
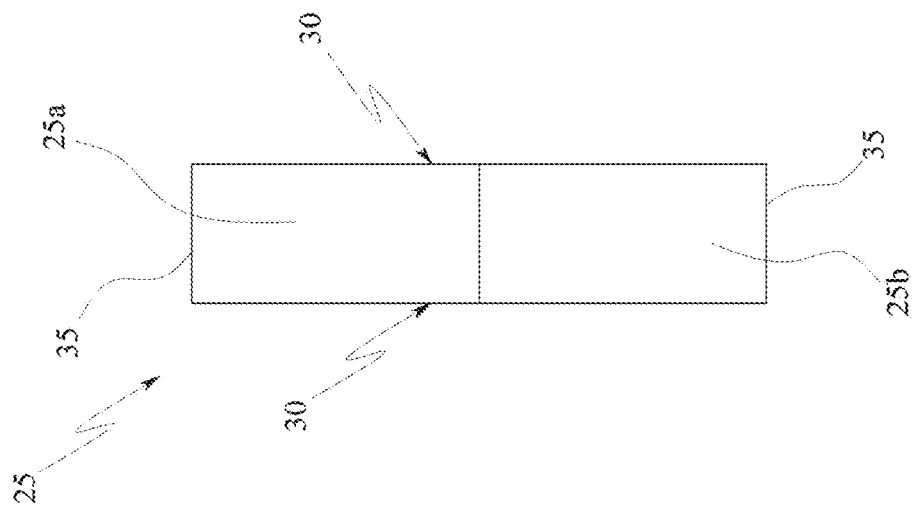
FIG. 10 shows a flat development of a second sheet of the reflective body of FIGS. 2, 3, 4, 5.

Furthermore, as shown in FIG. 8, the first parabola P1 has a first focal distance X1, by focal distance meaning the distance between the focal point (point where in the sun rays of the parabola itself are reflected) and the vertex V1, and the second parabola P2 has a second focal point X2 (see the above-mentioned definition) different with respect to the focal distance of the first parabola P1. In particular, the first focal distance X1 of the first parabola P1 is greater than the second focal distance X2 (see definition mentioned above) of the second parabola P2.

In the practice, the first focal point F1 distal from the vertex V1 of the first parabola P1 of a greater distance with respect to how distal the second focal point F2 is from the vertex V2 of the second parabola P2 and the parabolas 401 have a decreasing focal distance going from the first parabola P1 to the second parabola P2 (i.e. from the first edge 55 to the second edge 60).

The first sheet 40 may for example be shaped as a Bezier surface which approaches a multi-parabolic surface and is generated to start from two guide lines of parabolic shape corresponding or proximal to the outer edges of the reflective sheet, edges which respectively focus on the end points of the focal segment SF.

Each parabola 401 of the plurality of parabolas, has a vertex Vn1 placed on a vertex segment SV1.

The vertex segment SV1 joins the vertices Vn1 of all the parabolas 401, has as an end a first vertex V1 of the first parabola P1 and a second vertex V2 of the second parabola P2 and rests on a plane on which the focal segment SF also rests.

Furthermore, the vertex segment SV1 of each first sheet 40 is inclined at the angle with δ respect to the plane perpendicular to the plane passing through the middle point PM of the focal segment and perpendicular to the focal segment itself (i.e. the vertex segment SV1 is inclined at the angle δ with respect to the plane perpendicular to the sun rays).

The angle δ is calculated so as to ensure the best overlapping on the focal segment SF of the contributions of all the first sheets which make up the solar concentrator, optimizing the contribution both of the central portions of the sheet (proximal to the vertex segment SV1) and of the outer portions thereof.

The angle δ is variable according to the distance of the single first sheet 40 from the plane passing through the middle point PM of the focal segment SF and perpendicular to the focal segment itself, in particular it increases as the distance of said plane increases.

The angle δ of the first sheet 40 proximal to the plane passing through the middle point PM of the focal segment SF and perpendicular to the focal segment itself is, for example, preferably equal to 5°.

The projections of the vertex segments SV1 of the first sheets 40 on the plane perpendicular to the plane passing through the middle point PM of the focal segment SF and orthogonal thereto, are aligned along the alignment direction.

Each first sheet 40 consists, globally or at least the superficial (concave) layer thereof facing towards the focal segment SF, of an optically reflective material, for example metallised glass (for example silver-coated glass) or a metal foil (for example aluminium), for example perfectly polished.

Figure 9B:
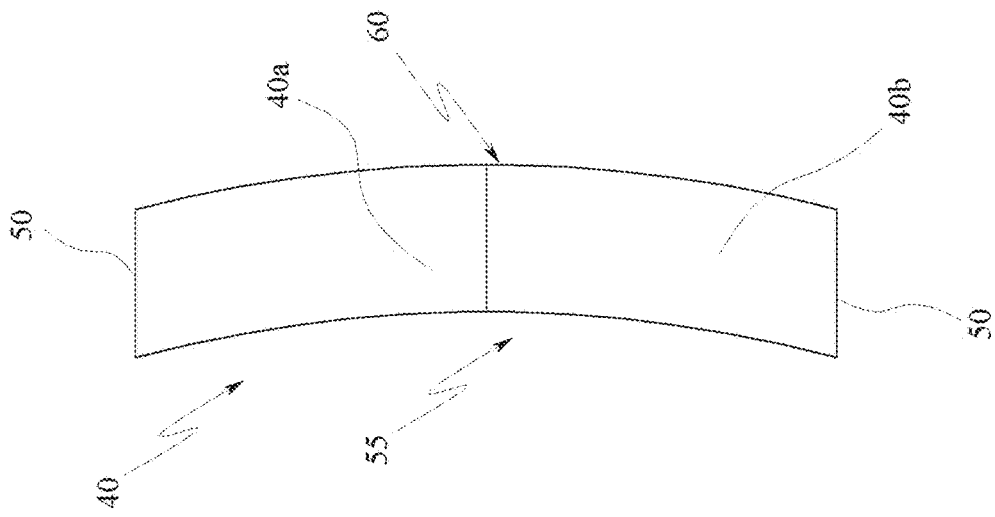
FIG. 9b shows an alternative embodiment of a flat development of a first sheet of the reflective body.
Figure 9A:
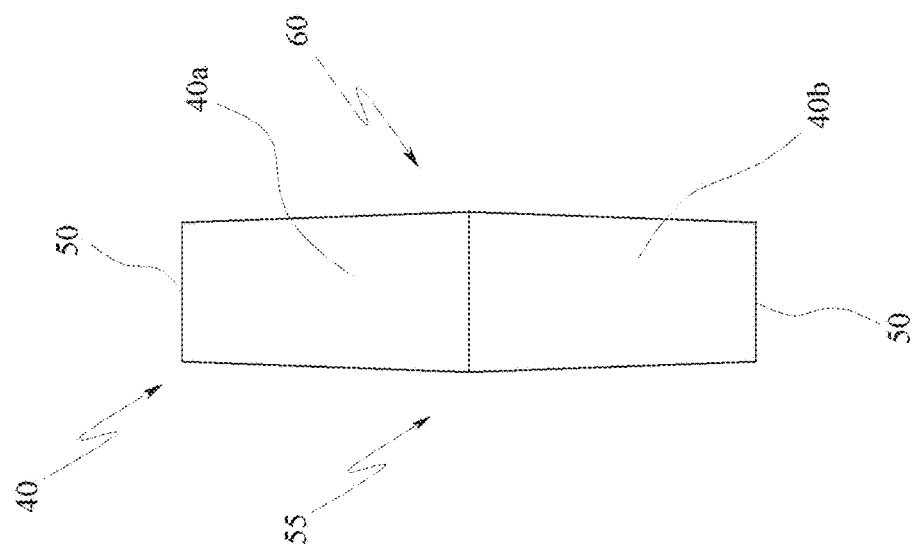
FIG. 9a shows a flat development of a first sheet of the reflective body of FIGS. 2, 3, 4, 5.
Figure 11:
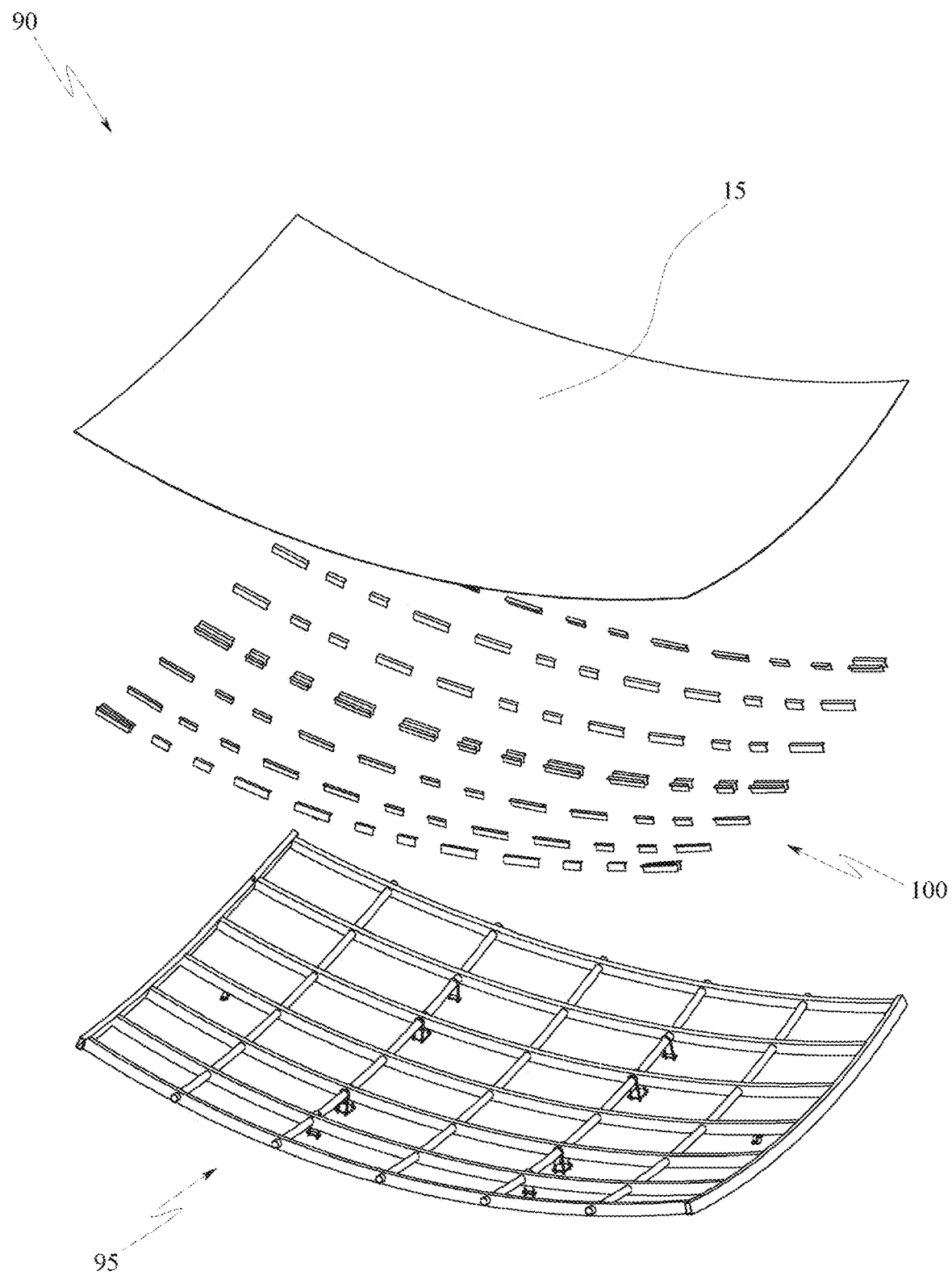
FIG. 11 shows an exploded axonometric view of a portion of the bearing structure of the concentrator according to the invention.

Each first sheet 40 is obtained by curvature of one or more flat reflective sheets, for example as shown in FIG. 9a, the first sheet 40 may be made of two trapezoidal portions 40a and 40b (for example isosceles), each of which is curved so as to form half of the parabolic surface at a varying focal distance.

The trapezoidal portions 40a and 40b, for example, may have any quadrangular shape, for example rhomboidal or even have any elongated form, for example with irregular edges.

For example, the pair of trapezoidal portions 40a and 40b which make up each first sheet 40 are mutually connected at the respective major bases.

It is not excluded, however, that each first sheet 40 may be made of one, two or more portions, having any shape, to better adapt to the needs of assembly and curvature of the sheet.

Each first sheet 40 may for example be made of a Fibre Metal Laminate, or other composite material containing fibre and resin and structural cores, adapted to maintain over time the exact curvature of the reflective sheet, thus ensuring to the same suitable mechanical resistance.

In the embodiment shown in the figures, the concentrator 10, i.e. the reflective body 15, comprises a second reflective sheet 25 of substantially elongated shape and defining a longitudinal axis Y substantially parallel to the longitudinal axis K.

The second sheet 25 flanks along the flanking direction to at least a first sheet 40, preferably the first sheets 40 are for example symmetrically arranged on opposite sides with respect to the second sheet 25 along the flanking direction and for example separated there from by the interspace 45. Furthermore, the second sheet 25 is arranged so that a middle plane thereof, parallel to the longitudinal axis Y of the same, coincides with the plane passing through the middle point PM of the focal segment SF and orthogonal to the focal segment itself.

For example, the second sheet 25 is delimited by a pair of major edges 30 which delimit the second sheet 25 in a direction parallel to the longitudinal axis Y, and a pair of minor edges 35 which delimit the second sheet in a direction transversal to the longitudinal axis Y.

The major edges 30 may for example have a profile formed by a line broken into two portions, or as an alternative a profile broken into more portions or curvilinear or the like.

The second sheet 25 comprises a reflective surface defined by a plurality of two-dimensional parabolas 251 alongside along the flanking direction, i.e. in a direction perpendicular to the longitudinal axis Y, so as to create a continuous surface.

In the practice, the parabolas 251 are arranged between the major edges 30 (for example excluded) of the second sheet 25.

The parabolas 251 lie on planes parallel to the longitudinal axis Y, having a constant focal distance along the flanking direction and focal point s Fn2 placed on the focal segment SF.

In the practice, the second sheet 25 is substantially shaped as a parabolic cylinder, i.e. a three-dimensional surface generated by the translation of the two-dimensional parabola along a line perpendicular to the plane on which said two-dimensional lies (i.e. along a line parallel to the focal segment SF).

Each parabola 251 has a vertex Vn2 placed on a vertex segment SV2, which connects the vertices Vn2 of all the parabolas 251, is parallel to the focal segment SF and has the same length L of said focal segment.

In the practice, the vertex segment SV2 of the second sheet 25 lies on the a plane perpendicular to the plane passing through the middle point PM of the focal segment SF and perpendicular thereto, i.e. (once placed in operation the solar concentrator) lies on a plane (which is maintained in use) perpendicular to the incident sun rays.

The vertex segment SV2 distal from the focal segment of a fixed focal distances X3 (see FIG. 8).

Each second sheet 25 consists globally or at least the superficial (concave) layer thereof facing towards the focal segment SF, of an optically reflective material, for example metallised glass (for example silver-coated glass) or a metal foil (for example aluminium), for example perfectly polished.

The second sheet 25 for example is made of two trapezoidal portions 25a and 25b (for example isosceles), each of which is bent so as to form half of the parabolic cylinder surface.

For example, the two trapezoidal portions 25a and 25b which make up the second sheet 25 are mutually connected at the respective major bases.

It is not excluded, however, that the second sheet 25 may be made of one, two or more portions, having any shape, to better adapt to the needs of assembly and curvature of the sheet.

The width L of the second sheet 25, i.e. the maximum distance between the pair of major edges 30, is greater than the width L' of the first sheet 40, i.e. the maximum distance between the first edge 55 and the second edge 60.

Due to this solution, the rays reflected by the first sheet 40 overlap on the focal segment SF from end to end to the sun rays reflected by the second sheet 25.

The width L' is variable according to the distance of the single first sheet 40 from the plane passing through the middle point PM of the focal segment SF and perpendicular to the focal segment itself, in particular such a width decreases as the distance of said plane increases.

While the preferred width L' of the first sheets 40 is characterised as indicated, so as to guarantee the best overlapping of the energy contributions of the different sheets, other widths are possible to address specific requirements.

The second sheet 25 may for example be made of a Fibre Metal Laminate, or other composite material containing fibre and resin and structural cores, adapted to maintain over time the exact curvature of the reflective sheet, thus ensuring to the same suitable mechanical resistance.

The reflective body 15 as a whole has a concave surface facing the focal segment SF and reflecting the sun rays towards the focal segment SF.

For example, the reflective body 15 has a longitudinal axis A orthogonal to the longitudinal axis Y of the second sheet 25 parallel to the flanking direction between the second sheet 25 and the first sheets 40.

For example, the concentrator 10, i.e. the reflective body 15, may comprise a first pair C1 of first sheets 40 arranged on one side and on the other with respect to the second sheet 25, next to the major edges 30 and substantially adjacent thereto at the respective first edges 55.

Furthermore, the reflective body 15 may comprise a second pair C2 of first sheets 40 symmetrically arranged on one side and the other with respect to the second sheet 25 and arranged outside the first pair C1 of the first sheets 40.

The first sheets 40 of the second pair C2 are inclined at an angle δ greater than the angle δ of the first sheets 40 of the first pair C1 and have a width L' smaller than the width L' of the first sheets 40 of the first pair C1.

Furthermore, the reflective body 15 may comprise a third pair C3 of first sheets 40 symmetrically arranged on one side and the other with respect to the second sheet 25 and arranged outside the second pair C2 of the first sheets 40.

The first sheets 40 of the third pair C3 are inclined at an angle δ greater than the angle δ of the first sheets 40 of the second pair C2 and have a width L' smaller than the width L' of the first sheets 40 of the second pair C2.

Furthermore, the reflective body 15 may comprise a fourth pair C4 of first sheets 40 symmetrically arranged on one side and the other with respect to the second sheet 25 and arranged outside the third pair C3 of the first sheets 40.

The first sheets 40 of the fourth pair C4 are inclined at an angle δ greater than the angle δ of the first sheets 40 of the third pair C3 and have a width L' smaller than the width L' of the first sheets 40 of the third pair C3.

In the practice, the angle δ increases going from the first sheets 40 proximal to the plane passing through the middle point PM of the focal segment SF and perpendicular thereto to the first sheets 40 distal there from, and the width L' decreases going from the first sheets 40 proximal to the plane passing through the middle point PM of the focal segment SF and perpendicular thereto to the first sheets 40 distal there from.

The first sheets 40 of the second pair C2, of the third pair C3 and of the fourth pair C4 are translated towards the focal segment SF with respect to a plane tangent to the second sheet 25 in the vertex segment SV2 of a quantity progressively growing and calculated by suitable algorithms.

The number of pairs of sheets 40 may be increased as desired above the value of four if solar concentrations greater than those of the example are desired.

For example, the reflective body 15 and/or the single sheets (first sheets 40 and the second sheet 25) of the concentrator 10 may be assembled (by bending reflective sheets) following the design steps of the following curvature.

First of all, the length of the focal segment SF is chosen, i.e. the length of the long and narrow rectangle on which the sun rays reflected by the reflective body 15 and the focal distance X3 of the system are to be concentrated, i.e. of the second sheet 25 of the concentrator 10.

Subsequently the desired concentration level may be chosen, and therefore the number of second sheets 40 of the concentrator 10 is determined based on the desired concentration level.

For example, if a concentration level substantially equal to 500 times (optimal for operating concentration photovoltaic cells of the multi-junction type placed at the focal segment SF) is desired, a number of 8 first sheets 40 and a number of 1 second sheets 25 is determined, for a total of 9 sectors (wherein each sector has a unit concentration level of about 60 times).

Other design parameters to keep in consideration are the opening of the reflective body 15, i.e. the minor axis of the reflective body 15 (i.e. the length of the first sheet 25 and/or of the second sheets 40 along the respective longitudinal axis), and the major axis of the reflective body 15 (i.e. the width obtained by the sum of the widths of the first sheet 25 and/or of the second sheets 40 along a direction orthogonal to the longitudinal axis and parallel to the focal segment SF).

For example, the minor axis of the reflective body 15 may be set at a measurement less than or equal to 3 metres (to facilitate the road transport thereof), for example 2.8 metres, and the major axis, may be set at a measurement greater than or equal to 4.5 metres, for example equal to 5 metres (so as to have a reflective surface of about 14 m$^2$.

The third focal distance X3, i.e. the focal distance of the system, may be for example set at 3.24 metres. To avoid excessive curvatures of the reflective elements, it is advised that the focus is greater than or equal to the opening, as described by the following relationship:

$$F/D >= 1,$$

wherein F is the third focal distance X3 and D is the opening (minor axis) of the reflective body 15.

At this point, determining the positioning reciprocal between the second sheet 25 (forced central position) and the first sheets 40 is carried out.

In particular, the arrangement mentioned above of the pairs C1, C2, C3 and C4 is determined and the angle δ for each of them is determined, proceeding from the first pair C1 towards the outside until all the pairs are positioned in the space.

The angle δ of each sector is for example calculated with the following formula:

$$2δ = \tan^{-1}(X/Y), \text{ wherein}$$

X is the distance of the first vertex V1 of each first sheet 40 from the plane orthogonal to the focal segment SF and passing through the end point distal from the considered first sheet; and Y is the distance of the first vertex of the line which contains the focal segment SF.

Then, determining (calculating) the width L' of each first sheet 40 is carried out according to the following relationship:

$$L' = L*\cos(2δ)/\cos(δ),$$

wherein L is the width of the focal segment SF and δ is the above-mentioned inclination angle of the first sheet 40.

Therefore, there are as a consequence the spatial positions of the first vertex V1 and of the second vertex V2 of each first sheet 40.

From this, then, the shape of the first parabola P1 and of the second parabola P2 of each first sheet 40 are determined, as described below and shown in FIGS. 14 and 15.

In particular, to determine the first parabola P1 of each first sheet 40, determining a first circular paraboloid K1 is carried out which:
- passes through the first vertex V1;
- has as a focus the first focal point F1 (of the focal segment SF); and
- has as a central axis Z1 an axis lying on a plane orthogonal to the focal segment SF and passing through the first focal point F1, in particular such a central axis is the intersection between the plane orthogonal to the focal segment SF passing through the first focal point F1 and the plane containing the focal segment SF and passing through the first vertex V1.

In the practice, it is noted that the first circular paraboloid K1, as determined above, has a focal distance X4 greater than the third focal distance X3 of the second sheet 25, i.e. the focal distance of the system.

The first parabola P1 is obtained by the intersection between:
- a first plane KP1, orthogonal to the focal segment SF and which does not contain the first focal point F1 (for example that passes through the first vertex V1), and
- the first circular paraboloid as determined above.

To then determine the second parabola P1 of each first sheet 40, determining a second circular paraboloid K1 is carried out which:
- passes through the second vertex V2;
- has as a focus the second focal point F2 (of the focal segment SF); and
- has as a central axis Z2 an axis lying on a plane orthogonal to the focal segment SF and passing through the second focal point F2, in particular such a central axis is the intersection between the plane orthogonal to the focal segment SF passing through the second focal point F2 and the plane containing the focal segment SF and passing through the second vertex V2.

In the practice, it is noted that the second circular paraboloid K2, as determined above, has a focal distance X5 smaller than the third focal distance X3 of the second sheet 25, i.e. the focal distance of the system.

The second parabola P2 is obtained by the intersection between:
- a second plane KP2, orthogonal to the focal segment SF and which does not contain the second focal point F2 (for example that passes through the second vertex V2), and
- the second circular paraboloid as determined above.

The first parabola P1 and the second parabola P2 of each first sheet 40 are then connected in the space interposed there between by a Bezier surface which approximates a multi-parabolic surface with vertices which lie on the vertex segment which connects the first vertex V1 and the second vertex V2.

Subsequently, where required, it is possible to slightly correct the position of the first vertex V1 and of the second vertex V2 and/or of the focal distances X4, X5 by a correcting iterative process, to optimize the directing and the centring of the rays reflected by the axially peripheral zones of each first sheet 40 on the focal segment SF.

The concentrator 10 comprises a target 20 on which the reflective sun rays 6 are directed.

The target 20 generally comprises a parallelepiped body with a rectangular base.

The target 20 is substantially placed in proximity to or at the focal segment SF, so as to receive the rays reflected and concentrated by the reflective body 15 of the concentrator 10.

The target 20 has, for example, at least one face 20a substantially flat (open or closed as will be better described below), which has a substantially rectangular shape with a longitudinal axis parallel to the focal segment SF.

The face 20a faces the reflective body 15 and lies on the plane parallel to the plane tangent to the second sheet 25 in the vertex segment SV2 and placed in proximity to or at the focal segment.

Such a face 20a of the target 20, besides being placed exactly at the focal segment SF, may also be arranged upstream of the focal segment SF, i.e. interposed between the focal segment SF and the reflective surface of the concentrator 10 (i.e. of the reflective body 15), or downstream thereof, i.e. so that the focal segment SF is interposed between the face 20a of the target 20 and the reflective surface of the concentrator 10 (i.e. the reflective body); so that the face 20a defines a rectangular area which crossed (hit) by a (respectively converging or diverging) solar radiation rectangle, which due to the shape of the second sheet 25 and of the first sheets 40 of the reflective body 15 of the concentrator 10 has an energy distribution substantially homogeneous in all the intersection area.

The target 20 may comprise a heat exchanger, for example a tube heat exchanger to produce hot water and/or vapour and/or oil or other heat transfer fluid or gas.

In this case, the face 20a of the target 20 is open and defines an access opening (inlet) configured for the entrance of the solar radiation reflected and concentrated by the concentrator 10 into the parallelepiped body of the target 20. Within the parallelepiped body of the target 20, at least a bundle tube is housed wherein a carrier liquid circulates adapted to receive the heat from the solar radiation entering in the target 20 itself.

As an alternative, the target 20 may comprise at least one photovoltaic panel, for example comprising a plurality of photovoltaic cells, facing the reflective surface of the concentrator 10 (i.e. the reflective body 15), and arranged on a substantially rectangular area.

In a further embodiment, the target 20 may comprise both a photovoltaic panel and a heat exchanger, for example placed behind the photovoltaic cells, which produce hot water and/or vapour also lowering the temperature of the photovoltaic cells of the photovoltaic panel.

Within the target 20 may comprise reflective surfaces suitably shaped, to optimise and uniform the light flow which enters in the front inlet 20a before the rays, coming from the reflective body 15, reach the destination thereof, being bundle tube or photovoltaic cells or other device.

The concentrator 10 further comprises a solar tracking bearing structure 80.

The bearing structure 80, for example, is adapted to be associated to solar tracking means known to the man skilled in the art not show in the figures; the tracking means are, for example, of the electro-mechanical structure type of sun tracking (solar tracker) on two axes, electronically and/or computer controlled. The bearing structure 80 is for example provided with a fixed base 85, for example provided with conventional ground supports (by means of a pole or other installation base) or fixed on roofs, walls or whatever.

The bearing structure 80 further comprising a shell 90 movably fixed, for example by means of an articulation, to the base 85.

The shell 90 has a shape substantially homologous to the shape of the reflective body 15, so as to support and embrace the reflective body itself.

The shell 90 comprises a grid of beams 95 provided with a plurality of uprights and crossbeams interconnected to form a monolithic structure, wherein for example the beams of the grid of beams 95 are mutually indissolubly connected for example by welding or gluing.

The shell 90 has a concave surface such as to copy the pattern of the convex surface of the reflective body 15.

The reflective body 15, i.e. the (rear) convex surface thereof, is fixed to the concave surface of the shell 90, for example by gluing, preferably between the reflective body 15 and the shell 90 a plurality of interconnecting plates 100 are interposed, which in the example are substantially "L" shaped.

The plates 100 have a first portion fixed by gluing to a portion of an upright or a crossbeam of the grid 95 and a second portion substantially perpendicular to the first portion and fixed by gluing to a portion of the reflective body 15.

The bearing structure 80 also comprising one or more support bars 105 of the target 20, adapted to maintain said target in front of the reflective body 15 in proximity to the focal segment SF.

Each bar 105 has a lower end fixed to the shell 90, for example in a peripheral point of the same, and an upper end converging towards the focal segment SF and supporting the target 20.

Through the bars 105, the target 20 is solidly constrained to the shell 90 and therefore to the reflective body 15 of the concentrator 10.

The operation of the concentrator 10 according to the invention is the following.

The reflective body 15 is oriented, during installation or by tracking means, in the direction of the sun and the incident rays are reflected by each of the reflecting sheets, i.e. by the second sheet 25 and each first sheet 40, making them converge on the focal segment SF.

Figure 13:
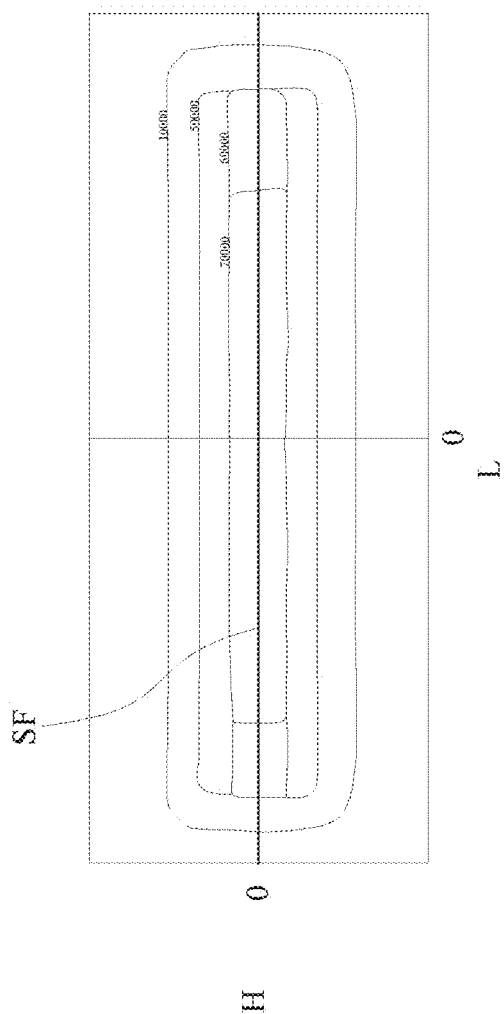
FIG. 13 shows a diagram obtained by stimulation software of the intensity of the sun ray concentration operated by a concentrator according to the invention.

Such reflected rays cross or impact the face 20a of the target 20, defining a rectangular area, substantially equal to the area of the face 20a, characterised by a high energy concentration evenly distributed on the entire rectangular area (see FIG. 13).

Figure 12:
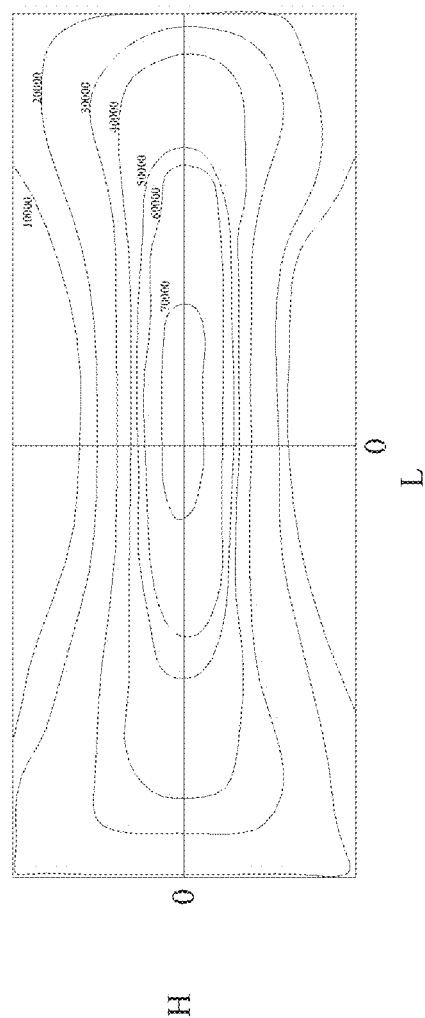
FIG. 12 shows a diagram obtained by stimulation software of the intensity of the sun ray concentration operated by a prior art parabolic cylinder concentrator.

In this way, the problem of the parabolic cylinder solar concentrators inclined to approximate a three-dimensional parabolic concentrator is solved, which (see FIG. 12) generate on the face 20a an energy distribution having a bone-shaped profile with a small portion at high energy concentration in proximity to the central portion of the face 20a, almost no concentration above or below the central portion and low at the sides.

Several changes and variations may be made to the invention thus conceived all falling within the scope of the inventive concept.

Moreover, all details can be replaced with other technically equivalent elements.

In the practice the materials used, as well as the shapes and sizes, may be any according to the requirements without departing from the scope of protection of the following claims.

The invention claimed is:

1. A concentrator (10) of sun rays comprising: a reflective body (15) adapted to reflect incident sun rays towards a focal segment (SF) at which the reflected sun rays intersect, wherein the reflective body (15) comprises a plurality of reflective first sheets (40) alongside each other along a flanking direction parallel to the focal segment (SF) and each of which is inclined with respect to a plane perpendicular to a plane passing through the middle point (PM) of the focal segment (SF) and orthogonal to the focal segment itself, wherein each first sheet (40) comprises a reflective surface defined by a plurality of parabolas (401), which are alongside each other with respect to the flanking direction of the first sheets (40) and each have a vertex (Vn1) placed on a vertex segment (SV1), which joins all the vertices (Vn1) of the parabolas (401) and rests on a same plane of the focal segment (SF); wherein the parabolas (401) of each first sheet (40) have a focal distance varying along the flanking direction and are configured such that each parabola has a focal point (F1, Fn1, F2) placed on the focal segment (SF).

2. The concentrator (10) according to claim 1, wherein the plurality of first sheets (40) is symmetrically arranged with respect to a plane passing through the middle point (PM) of the focal segment (SF) and orthogonal to the focal segment (SF) itself.

3. The concentrator (10) according to claim 2, wherein the plurality of first sheets is symmetrically arranged on opposite sides with respect to the second sheet (25).

4. The concentrator (10) according to claim 1, which comprises a second sheet (25) shaped as a parabolic cylinder alongside, with respect to the flanking direction, at least one of the first sheets (40), wherein the parabolic cylinder comprises a reflective surface defined by a plurality of parabolas (251) alongside each other with respect to the flanking direction and each having a vertex (Vn2) placed on a vertex segment (SV2), which joins all the vertices (Vn2) of the parabolas (251) and is parallel to the focal segment (SF), wherein the parabolas (251) of each second sheet (25) have a constant focal distance along the flanking direction and are configured such that each parabola (251) has a focal point (Fn2) placed on the focal segment (SF).

5. The concentrator (10) according to claim 4, wherein a middle plane (M) of the second sheet (25), which is orthogonal to the vertex segment (V2) thereof, coincides with a plane passing through the middle point (PM) of the focal segment (SF) and orthogonal to the focal segment (SF) itself.

6. The concentrator (10) according to claim 4, wherein
the vertex segment (SV2) of the second sheet (25) is parallel to the focal segment (SF) and has a length equal to the length of the focal segment (SF); and
the vertex segment (SV1) of the first sheet (40) rests on a plane containing the focal segment (SF) and the vertex segment (SV2) of the second sheet (25) and is inclined by an angle δ with respect to the vertex segment (SV2) of the second sheet (25) and has a length L' calculated according to the following equation:

$$L''=L^*\cos(2\delta)/\cos(\delta),$$

wherein L is the length of the focal segment SF, and δ is the above-mentioned inclination angle of the vertex segment (SV1) of the first sheet (40) with respect to the vertex segment (SV2) of the second sheet (25).

7. The concentrator (10) according to claim 1, wherein the reflective body (15) is a monolithic body obtained by the indissoluble combination of at least the plurality of first sheets (40).

8. The concentrator (10) according to claim 1, characterised in that it comprises a solar tracking bearing structure (80) adapted to support and orient the reflective body (15), wherein the bearing structure (80) comprises a fixed base (85) and a shell (90) movably connected to the base (80), wherein the shell (90) is formed by a grid of beams (95).

9. The concentrator (10) according to claim 8, wherein the reflective body (15) is fixed to the grid of beams (95) which forms the shell (90) of the bearing structure (80) by gluing.

10. The concentrator (10) according to claim 1, characterized in that it comprises a target (20) placed at the focal segment (SF).

11. The concentrator (10) according to claim 1, wherein each first sheet (40) comprises a first two-dimensional parabola (P1) of the plurality of parabolas (401) provided with a first focal point (F1) placed at a first end of the focal segment (SF), and a second two-dimensional parabola (P2) of the plurality of parabolas (401) provided with a second focal point (F2) placed at a second end of the focal segment (SF) opposite the first end thereof where the first focal point (F1) is found, wherein the first parabola (P1) has a focal distance different and greater than the focal distance of the second parabola (P2); the first sheet (40) being defined by a Bezier surface, which approaches a multi-parabolic surface, which joins the first parabola (P1) to the second parabola (P2).

12. The concentrator (10) according to claim 11, wherein
the first parabola (P1) is obtained by the intersection between a first plane orthogonal to the focal segment (SF) and which does not contain the first focal point (F1) and a circular paraboloid having as a focus the first focal point (F1) and as an axis an axis resting on a plane orthogonal to the focal segment (SF) and passing through the first focal point (F1); and
the second parabola (P2) is obtained by the intersection between a second plane orthogonal to the focal segment (SF) and which does not contain the second focal point (F2) and a circular paraboloid having as a focus the second focal point (F2) and as an axis an axis resting on a plane orthogonal to the focal segment (SF) and passing through the second focal point (F2).

* * * * *